(12) United States Patent
Krill

(10) Patent No.: US 6,662,885 B2
(45) Date of Patent: Dec. 16, 2003

(54) METHOD AND APPARATUS FOR PROVIDING A STREAM OF PRESSURIZED SUBSTANTIALLY INERT GAS

(75) Inventor: Ross Michael Krill, Calgary (CA)

(73) Assignee: Precision Drilling Technology Services Group, Inc. (CA)

( * ) Notice: Subject to any disclaimer, the term of this patent is extended or adjusted under 35 U.S.C. 154(b) by 33 days.

(21) Appl. No.: 09/983,461

(22) Filed: Oct. 24, 2001

(65) Prior Publication Data

US 2003/0075332 A1 Apr. 24, 2003

(51) Int. Cl.⁷ .............................................. E21B 21/00
(52) U.S. Cl. ......................... 175/66; 175/71; 166/305.1
(58) Field of Search ........................... 175/65, 66, 71; 166/305.1, 311; 507/102, 202

(56) References Cited

U.S. PATENT DOCUMENTS

| | | | |
|---|---|---|---|
| 3,815,673 A | * | 6/1974 | Bruce et al. ................. 166/359 |
| 4,136,747 A | | 1/1979 | Mallory |
| 4,350,505 A | | 9/1982 | Mallory |
| 5,273,344 A | | 12/1993 | Volkwein |
| 5,412,940 A | * | 5/1995 | Baugh ........................... 60/274 |
| 5,607,903 A | | 3/1997 | Bastos |
| 5,663,121 A | | 9/1997 | Moody ........................... 175/71 |
| 6,032,747 A | * | 3/2000 | Moody et al. ................. 175/71 |

* cited by examiner

*Primary Examiner*—William Neuder
*Assistant Examiner*—Matthew J Smith
(74) *Attorney, Agent, or Firm*—Merek, Blackmon & Voorhees, LLC

(57) ABSTRACT

Disclosed is a method of producing a pressurized stream of substantially inert gas. The method comprises collecting the exhaust gases from an internal combustion engine, directing the exhaust gases into the intake of a compressor for compressing to a desired pressure, and recirculating a portion of the compressed exhaust gases back to the intake of the compressor such that the pressure of the exhaust gases within said compressor intake is maintained above atmospheric pressure. Also disclosed is an apparatus for producing a pressurized stream of substantially inert gas utilizing the described method.

7 Claims, 1 Drawing Sheet

METHOD AND APPARATUS FOR PROVIDING A STREAM OF PRESSURIZED SUBSTANTIALLY INERT GAS

FIELD OF THE INVENTION

This invention relates to a method and an apparatus for producing a stream of pressurized substantially inert gas, and in one particular embodiment to a method and an apparatus for producing a stream of pressurized substantially inert gas for use in drilling wells through hydrocarbon formations.

BACKGROUND OF THE INVENTION

A stream of readily available, inexpensive and substantially inert gas is often required for a variety of different industrial applications. In this context the term substantially inert is used to generally describe gases with little or no appreciable free oxygen content. Such gases may contain varying amounts of hydrocarbons and other compounds and are for that reason not be truly inert, however, for the intended applications described below if a gas contains little or no appreciable free oxygen it will be considered to be substantially inert.

One such industry that requires a source of substantially inert gas is the petroleum industry. In oil drilling and production, substantially inert gases are often required for purposes of drilling, reservoir pressure maintenance, and for purging systems. For example, when drilling an oil or gas well, drilling fluids are often required to be circulated from the surface down through the drill string to the drill bit and back up to the surface again. The function of the drilling fluids is largely to control subsurface pressures, to carry away cuttings and other debris from the bottom of the well bore, and to eventually flush the cuttings from the well. In some instances the drilling fluids may also be used to "power" a downhole motor used to drive a drill bit. In certain types of drilling, and most notably underbalanced drilling, relatively low density drilling fluids that have densities generally less than water are utilized. In many such instances the low density fluids are comprised of gases. To minimize potential fire, explosion, and corrosion problems, ideally such gases are substantially inert.

Historically inert gases (for example nitrogen) that are required for use in drilling operations have been transported to drilling sites in sealed pressure vessels. However, due to the transportation costs associated with bringing large volumes of inert gas to a remote oil or gas drilling site, a practice has developed wherein the exhaust gas stream from an internal combustion engine is utilized as a source of substantially inert gas. In such applications exhaust gases from the internal combustion engine are typically collected, cooled, deacidified if necessary, and then directed to a compressor where their pressure is increased prior to being injected into a well. Provided that the internal combustion engine operates at a high enough level of efficiency there will be either no oxygen in the exhaust or only a relatively minor amount of oxygen present.

While the exhaust stream from an internal combustion engine provides a somewhat convenient and readily accessible supply of substantially inert gas, an inherent problem that arises when utilizing exhaust gas as a feed source for a compressor is that the compressor will typically have a higher capable throughput than the volume of exhaust gas that can be created by the engine. Where there is insufficient exhaust to feed the compressor, a vacuum will tend to form within the intake manifold. This vacuum in turn has a tendency of drawing atmospheric air into the system. If atmospheric air is allowed to enter the gas stream the percentage of oxygen in the gas injected into the well increases, thereby increasing the possibility of an explosion or fire, and increasing the likelihood of corrosion.

To combat this problem others have tried to direct the output from other unrelated internal combustion engines (for example nearby generator sets, etc.) into the feed stream of the compressor to balance the available exhaust gas stream with the compressor's input. Unfortunately the amount of unrelated exhaust gas readily available is rarely sufficient. Still others have connected hydraulic or mechanical brakes, generators or other devices to the internal combustion engine in an attempt to force it to operate under an enhanced load situation so as to generate excess exhaust. While such attempts have had limited success under specific circumstances, they add mechanical complexity, expense, and a further source for mechanical breakdown.

SUMMARY OF THE INVENTION

The invention therefore provides a method and apparatus for producing a stream of substantially inert gas from an internal combustion engine that provides a means of effectively increasing the load on the engine to enhance exhaust gas production, while simultaneously providing sufficient intake gas to meet the needs of a compressor or bank of compressors. The invention accomplishes this result without the need to utilize the exhaust gases from unrelated internal combustion engines, and without the addition of complex and costly mechanical structures. The invention also provides for the establishment and the maintenance of a positive gas pressure within the compressor intake manifold to limit the ingress of atmospheric air into the compressor system.

Accordingly, in one of its aspects the invention provides a method of producing a pressurized stream of substantially inert gas, the method comprising collecting the exhaust gases from an internal combustion engine; directing said exhaust gases into the intake of a compressor, said compressor compressing said exhaust gases to a desired pressure; and, recirculating a portion of said compressed exhaust gases back to said intake of said compressor such that the pressure of said exhaust gases within said compressor intake is maintained above atmospheric pressure.

In a further aspect the invention provides an apparatus for producing a pressurized stream of substantially inert gas, the apparatus comprising a compressor having an intake manifold and an output manifold, said intake manifold receiving the output exhaust gas stream from an internal combustion engine; and, a compressed gas re-circulation conduit connecting said output manifold to said intake manifold such that a portion of the pressurized gas from said compressor is re-circulated from said output manifold back to said intake manifold to maintain the gas pressure within said intake manifold above atmospheric pressure.

Further advantages of the invention will become apparent from the following description taken together with the accompanying drawings.

BRIEF DESCRIPTION OF THE DRAWINGS

For a better understanding of the present invention, and to show more clearly how it may be carried into effect, reference will now be made, by way of example, to the accompanying drawings which show the preferred embodiments of the present invention in which.

DESCRIPTION OF THE PREFERRED EMBODIMENT

Figure 1:
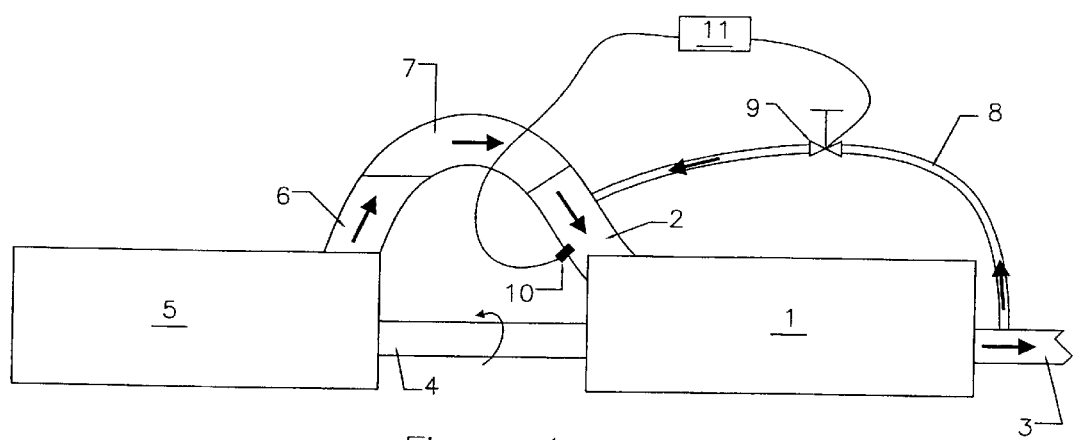
FIG. 1 is a side pictorial view of an internal combustion engine driving a compressor depicting the present invention.

The present invention may be embodied in a number of different forms. However, the specification and drawings that follow describe and disclose only some of the specific forms of the invention and are not intended to limit the scope of the invention as defined in the claims that follow herein.

With reference to FIG. 1 there is shown pictorially an apparatus constructed in accordance with one of the preferred embodiments of the present invention. FIG. 1 shows a compressor 1 having an intake manifold 2 and an output manifold 3. Compressor 1 may take the form of any one of a wide variety of commonly available compressors or compressor systems and may be driven by an equally wide variety of power sources. In the embodiment shown in FIG. 1, compressor 1 is driven by means of the rotating drive shaft 4 of an internal combustion engine 5.

Where, as in the case of the present invention, there is a desire to produce a pressurized stream of substantially inert gas, intake manifold 2 is preferably designed to receive the output exhaust gas stream from one or more internal combustion engines. In configurations such as that shown in FIG. 1 delivering an output exhaust gas stream to intake manifold 3 can be accomplished through connecting the exhaust manifold 6 of internal combustion engine 5 to intake manifold 2 by means of a duct or conduit 7. Depending upon the proximity of compressor 1 to internal combustion engine 5, in some instances it may be possible to directly connect compressor intake manifold 2 to internal combustion engine exhaust manifold 6.

Whether or not the two manifolds are connected directly, or indirectly through use of a duct or conduit 7, in the described configuration the compressor feed will be comprised of the output exhaust gas stream from internal combustion engine 5. It should be noted that in some circumstances it may also be desirable to direct the exhaust gas stream from additional internal combustion engines operating in the general vicinity of compressor 1 into intake manifold 2. Similarly, where compressor 1 is driven by an electric motor or other power source, it will be understood that the exhaust gas stream from one or more separate internal combustion engines will need to be directed to the compressor's intake manifold.

When producing a stream of substantially inert gas for a particular application (for example for down hole drilling through hydrocarbon formations, reservoir pressure maintenance, purging, etc.) it is often imperative that the gas stream be essentially devoid of any oxygen content. Typically, during the operation of compressor 1, a vacuum condition would be established within the compressor's intake manifold as it draws air or gas through it. Where, as in the present case, the feed for the compressor is the exhaust gas stream from an internal combustion engine, to the extent possible it is therefore preferable to balance the draw of the compressor against the exhaust output of the engine so as to limit the draw of atmospheric air into the system. Unfortunately, from a practical perspective it is rarely possible to precisely match the output of the engine with the requirements of the compressor over all ranges of operating conditions. As a result a vacuum condition within the compressor's intake manifold is often established causing the compressor to draw into its intake manifold atmospheric air and introducing oxygen into the compressed gas stream.

To combat this scenario, the present invention utilizes a compressed gas re-circulation passageway or conduit 8 that connects compressor output manifold 3 to intake manifold 2 such that a portion of the pressurized gas exiting compressor 1 is re-circulated from the output manifold back to the intake manifold. The provision of pressurized gas from the output to the intake manifold in this manner assists in maintaining the gas pressure within intake manifold 2 above atmospheric pressure. Provided that the feed of compressor 1 is substantially inert, the compressed gas that is re-circulated through conduit 8 will also be substantially inert and its introduction into intake manifold 2 will not result in the addition of oxygen or atmospheric gases into the compressor system. Pressurizing intake manifold 2 with substantially inert gas in this manner, such that the gas pressure within the intake manifold is maintained above atmospheric pressure, will prevent any draw of atmospheric gases (including oxygen) into the system.

It will be appreciated that the re-circulation of a portion of the compressed exhaust gases will require that the compressor be designed with an increased capacity above and beyond the capacity of output gas required for the desired application. That is, since a portion of the gas exiting the compressor through output manifold 3 will be recycled back to the intake manifold, the entire output of the compressor will not be available for use in the desired application. The compressor will therefore have to be oversized to accommodate the re-circulation of a portion of its pressurized output stream. Oversizing the compressor and effectively increasing its volumetric throughput provides the added benefit of increasing the load on internal combustion engine 5, which in turn increases the production of exhaust gases that will be available for compressor feed. The oversized compressor can thus be used to maximize the horsepower output of the internal combustion engine (and hence the production of exhaust gases) while at the same time preventing the compressor from being "starved" of feed gas on account of the re-circulation of pressurized gases from output manifold 3 to intake manifold 2 by means of re-circulation conduit 8.

With reference again to FIG. 1, in a preferred embodiment of the invention a valve 9 is situated within gas re-circulation conduit 8 to allow for the control of the volume and flow of gas therethrough. Depending on the desired degree of automation, valve 9 can be either manually controlled or automatically controlled through pneumatic, hydraulic or electric actuators. Alternatively, valve 9 could also be a regulator that maintains compressor inlet pressure by way of a spring. Where valve 9 is manually controlled typically there would be placed within intake manifold 2 a pressure gauge indicating to an operator the internal gas pressure within the manifold so that manual adjustments to valve 9 may be made as necessary in order to maintain a desired manifold pressure.

In a further embodiment of the invention a pressure sensor 10 may be mounted within intake manifold 2 and connected to a microprocessor control 11. In this embodiment valve 9 would preferably be an automatic valve having an actuator also controlled by microprocessor 11. Programing the microprocessor control will then allow valve 9 to be automatically adjusted in response to changes in gas pressure detected within intake manifold 2 by pressure senor 10. Microprocessor control 11 will thus help to ensure that the flow of compressed gas from output manifold 3 to intake manifold 2 is controlled in response to fluctuations in the gas pressure within the intake manifold so as to maintain the pressure within the intake manifold between a pre-determined upper and lower limit. In the event that the gas pressure within intake manifold 2 should for some reason (whether it be through mechanical breakdown, blockage of conduits, etc.) drop below atmospheric levels, microprocessor 11 could be designed to activate an alarm to notify an operator that there is a danger that atmospheric air may be drawn into the system or, alternatively, the compressor system may be caused to shut down pending an investigation of the problem.

It will therefore be appreciated that the above described device provides an apparatus and a method for producing a pressurized stream of substantively inert gas that minimizes the risk that atmospheric oxygen may be drawn into the gas stream. This apparatus and method also allows for the utilization of a readily available source of substantially inert gas in the form of the exhaust gas stream from an internal combustion engine. The described apparatus and method may also either reduce the necessity of employing expensive catalytic convertors or other devices to remove atmospheric oxygen that may otherwise be drawn into the system, or reduce the amount of oxygen that such systems are required to remove from the exhaust stream and thereby reduce the operating costs of such secondary systems. The described device and method may also be retrofitted onto existing compressor systems and readily lends itself to automatic control. The compressed substantially inert gas that is expelled through output manifold 3 of compressor 1 will be substantially devoid of oxygen and generally suitable for a wide variety of different applications, including injecting into a wellbore while drilling through hydrocarbon formations.

It is to be understood that what has been described are the preferred embodiments of the invention and that it may be possible to make variations to these embodiments while staying within the broad scope of the invention. Some of these variations have been discussed while others will be readily apparent to those skilled in the art.

I claim:

1. A method of producing a pressurized stream of substantially inert gas, the method comprising:
   (i) collecting the exhaust gases from an internal combustion engine;
   (ii) directing said exhaust gases into the intake of a compressor, said compressor compressing said exhaust gases to a desired pressure, said internal combustion engine driving said compressor; and,
   (iii) recirculating a portion of said compressed exhaust gases back to said intake of said compressor such that the pressure of said exhaust gases within said compressor intake is maintained above atmospheric pressure.

2. The method as claimed in claim 1 including controlling the volume of recirculated compressed exhaust gases delivered to said compressor intake to increase the volumetric throughput of said compressor and increase the load on said internal combustion engine to thereby generate a volume of exhaust gases from said engine that substantially matches the input requirements of said compressor.

3. The method as claimed in claim 1 wherein the volume of said re-circulated compressed exhaust gas delivered to said compressor intake is controlled through the use of one or more valves situated within a re-circulation conduit that delivers said re-circulated compressed exhaust gases to said compressor intake.

4. The method as claimed in claim 1 including monitoring the gas pressure within said compressor intake and adjusting the flow of said re-circulated compressed exhaust gases delivered to said compressor intake in response to fluctuations in the gas pressure within said compressor intake so as to maintain the gas pressure within said intake within pre-determined levels.

5. A method of producing a pressurized stream of substantially inert gas, the method comprising:
   (i) collecting the exhaust gases from a first internal combustion engine;
   (ii) collecting the exhaust gases from an additional internal combustion engine and directing said exhaust gases into the intake of a compressor, said compressor compressing said exhaust gases to a desired pressure; and,
   (iii) recirculating a portion of said compressed exhaust gases back to said intake of said compressor such that the pressure of said exhaust gases within said compressor intake is maintained above atmospheric pressure.

6. The method as claimed in claim 5 wherein the volume of said re-circulated compressed exhaust gas delivered to said compressor intake is controlled through the use of one or more valves situated within a re-circulation conduit that delivers said re-circulated compressed exhaust gases to said compressor intake.

7. The method as claimed in claim 5 including monitoring the gas pressure within said compressor intake and adjusting the flow of said re-circulated compressed exhaust gases delivered to said compressor intake in response to fluctuations in the gas pressure within said compressor intake so as to maintain the gas pressure within said intake within pre-determined levels.

* * * * *